May 5, 1959 D. G. SCORGIE 2,885,631

PUSH-PULL MAGNETIC AMPLIFIER

Filed May 29, 1956

INVENTOR
DONALD G. SCORGIE

BY W R Maltby

Richard C Reed ATTORNEYS

United States Patent Office

2,885,631

Patented May 5, 1959

2,885,631

PUSH-PULL MAGNETIC AMPLIFIER

Donald G. Scorgie, Pittsburgh, Pa., assignor to the United States of America as represented by the Secretary of the Navy Application May 29, 1956, Serial No. 588,196

10 Claims. (Cl. 323—89)

(Granted under Title 35, U.S. Code (1952), sec. 266)

The invention described herein may be manufactured and used by or for the Government of the United States of America for governmental purposes without the payment of any royalties thereon or therefor.

This invention relates generally to magnetic amplifiers and more specifically to a magnetic amplifier with ring modulator rectifier configuration.

Magnetic amplifiers in their simpler form are capable of delivering power to a load only during alternate half cycles of the supply frequency, usually referred to as the gating half cycles. The intervening or reset half cycles are used to preset the core to control the conducting period of the gating half cycles. Amplifiers of this type have been expanded to full wave form in which, by the addition of another core, power can be delivered to the load on successive half cycles by arranging the gating half cycles of each core to occur in alternation. Full wave circuits usually require rectifiers properly polarized in the control circuits to permit the control circuits to effect core saturation only during reset half cycles. As an additional disadvantage, with one core delivering power to the load and the other resetting, there is a danger that the load current will effect the reset of the resetting core thus producing considerable non-linearity and distortion.

It is therefore an object of this invention to overcome the above-named disadvantages.

It is another object of this invention to provide a magnetic amplifier requiring no rectifiers in the control circuit.

It is another object of this invention to provide a full wave magnetic amplifier in which the resetting cores are not effected by the output pulses.

It is another object of this invention to provide a magnetic amplifier with ring modulator rectifier configuration in which the resetting cores are decoupled from the effects of the output pulses.

It is another object of this invention to provide a full wave magnetic amplifier having a feedback path between the output and the control circuits to prevent output pulses from coupling to the resetting cores through the control circuit.

It is another object of this invention to provide a magnetic amplifier with phase reversible alternating current output and reversible direct current output polarity.

Other objects and advantages of this invention will become apparent upon a detailed consideration of the following description and accompanying drawings wherein.

Briefly, the magnetic amplifier of this invention comprises four saturable cores arranged with four rectifiers in a ring circuit with the rectifiers polarized to permit conduction around the ring in one direction. The alternating supply source is supplied through center tapped transformer windings to two opposite ring terminals, the other two ring terminals are connected together and to the center tap of an output transformer. The pair of control windings associated with each A.C. feed point are differentially polarized so that their cores are oppositely driven toward saturation in response to the control signal. The A.C. feed points are polarized so that they are alternately effective in supplying power to the load. Because each pair of control windings are differentially polarized one of their corresponding load windings will reach saturation before the other during the gating half cycle. The direction of current to the output transformer is determined by the core which saturates first. Thus the phase or polarity of the control signal is maintained in the output circuit. Circuit means are provided to maintain zero voltage across the load windings of the resetting cores and a feedback path is provided between the output circuit and the control circuit so that the output voltage cannot effect the resetting cores through either their control or load circuits.

Figure 1:
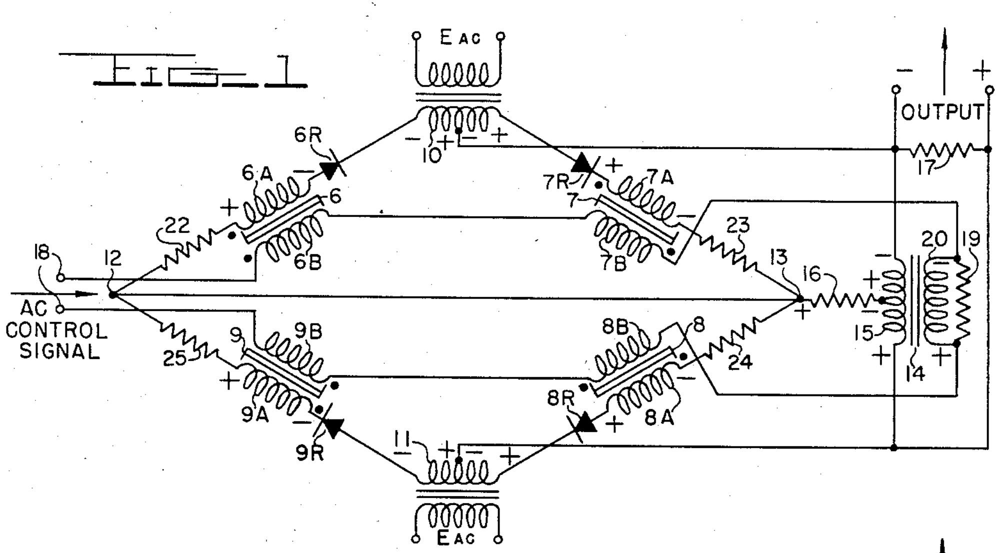
Fig. 1 is a schematic diagram of a preferred embodiment of this invention.

Referring now to Fig. 1 in detail, there is here shown a schematic diagram of a preferred embodiment of this invention. Four saturable core transformers 6, 7, 8 and 9, are shown having load windings $6_A$, $7_A$, $8_A$ and $9_A$ serially connected in ring form. Associated with each control winding is rectifier $6_R$, $7_R$, $8_R$ and $9_R$ interposed in the series circuit and polarized to permit current to flow in one direction around the ring. The alternating supply source is connected to the ring through two center tapped transformer windings 10 and 11 disposed respectively between the circuits of transformers 6 and 7 and transformers 8 and 9. Windings 10 and 11 may be on separate cores as shown or may be on a single core with a single primary winding connected to the alternating supply source $E_{ac}$. Ring circuit terminals 12 and 13 are located respectively between the circuits of transformers 6 and 9 and transformers 7 and 8. Terminals 12 and 13 are directly connected together. An output transformer 14 has a center tapped primary 15 connected across the center taps of windings 10 and 11. The center tap of winding 15 is connected through a resistance 16 to the ring terminals 12 and 13. A load resistance 17 is connected in parallel with winding 15 of transformer 14. Each of the saturable core transformers has a control winding $6_B$, $7_B$, $8_B$ and $9_B$ serially connected in a second ring circuit. The second ring circuit is broken by terminals 18 to which may be applied an alternating control signal. Serially connected in the second ring circuit with the control windings is a resistor 19 in parallel with a winding 20 on transformer 14. The control windings for the pair of transformers associated with each supply winding are differentially polarized. More specifically, the control windings $6_B$ and $7_B$ of transformers 6 and 7 are differentially polarized with respect to their load windings $6_A$ and $7_A$, similarly, control windings $8_B$ and $9_B$ are differentially polarized with respect to their load windings $8_A$ and $9_A$. Thus the same reset current through windings $6_B$ and $7_B$ flows in opposite directions and tends to reset cores 6 and 7 in opposite directions. Similarly the control current tends to reset cores 8 and 9 in opposite directions. A.C. supply windings 10 and 11 are polarized as shown so that they are essentially in parallel and in the absence of the rectifiers would oppose current around the ring. The circuit can also be considered as an upper and lower ring circuit, each independent of the other except for a single common terminal represented by 12 and 13. Because of the direct connection between terminals 12 and 13, current from either A.C. windings 10 or 11 is restricted to the upper or lower ring in which it lies. However output voltage in transformer 15, except for the unique feature of this invention, would tend to produce current through either cores 6 and 9 or 7 and 8. The latter is undesirable since in either case it includes one core which is gating and one which is resetting.

The operation of the circuit in Fig. 1 might best be understood by considering the current flow for a particular cycle of operation. With diodes $6_R$, $7_R$, $8_R$ and $9_R$ considered to carry current rather than electrons in the direction of their arrows, and for the half cycle shown where the right end of each of transformer windings 10 and 11 is positive, it will be seen that diodes $6_R$ and $7_R$ will permit conduction of current from winding 10 through the common terminals 12 and 13 while rectifiers $8_R$ and $9_R$ will prevent current flow from winding 11. Therefore cores 6 and 7 will be on their gating half cycle and cores 8 and 9 on their reset half cycle. If cores 6 and 7 were to reach saturation at the same time heavy current would begin to flow through both load windings around the upper half of the ring circuit and no current would be delivered to the load. However since the control signal has reset the cores 6 and 7 in opposite directions due to the differential polarity of control windings $6_B$ and $7_B$, the core which moves in the same direction towards saturation during the gating half cycle as it was set during the reset cycle will saturate before the other core. Presuming that core 7 will be the one to saturate first, when it reaches saturation current will flow through load winding $7_A$, resistor 16, the upper half of winding 15 of output transformer 14 and back to the center tap of supply winding 10, a voltage will be induced in the remainder of winding 15 by autotransformer action and transmitted by the parallel connection to load resistor 17. Had the control signal been of opposite polarity, cores 6 and 7 would have been reset in opposite direction to that presumed and core 6 would have been the first to saturate on the gating half cycle. If this were to occur the load current would flow from the center tap of transformer 10 through the upper half of winding 15, resistor 16, terminal 12 and load winding $6_A$ back to supply winding 10, it will be observed that the load current when core 6 saturates first passes through the output transformer 14 in opposite direction to that when core 7 saturates first. Therefore it will be seen that the polarity of the control signal is preserved in the amplifier output. When cores 6 and 7 are on their reset half cycle, cores 8 and 9 are on their gating half cycle and thus power is delivered to the load during each half cycle of the supply current.

Referring again to the initial presumed condition where cores 6 and 7 are on their gating half cycle and core 7 saturates first, at the instant core 7 saturates the pulse of current through load winding $7_A$ would tend to induce current in control winding $7_B$. This would be objectionable since control winding $7_B$ is in series with control windings $8_B$ and $9_B$ which are on their resetting half cycle and thus the gating pulse in core 7 could effect the reset of cores 8 and 9. To avoid this the feedback circuit comprising resistor 19 and winding 20 on transformer 14 is provided. At the instant the gating pulse appears in load winding $7_A$ and the upper half of winding 15, it induces a current in winding 20 on transformer 14 which is in series with the control circuit including the four control windings. By suitably selecting the turns ratio and the polarity of windings 15 and 20, a feedback voltage can be introduced to the control windings from transformer 14 which will exactly oppose the current introduced into the control windings from the gating pulse in any of the load windings.

While the feedback circuit just described prevents the output pulse from coupling to the resetting cores through the control circuit, separate provision must be made to prevent the output pulses from being coupled to the resetting cores through their load windings. To prevent the output pulses from causing current to flow in the load windings of the resetting cores, resistor 16 has been inserted between the common terminals 12 and 13 and the center tap of output transformer winding 15. The value of resistance 16 is chosen so that when an output voltage is produced, substantially half is developed across resistor 16. Presuming that cores 8 and 9 are resetting, this operates to maintain common terminals 12 and 13 at the same potential as the center tap of winding 11, with these three points at the same potential obviously no current will flow through connecting load windings $9_A$ and $8_A$.

Figure 2:
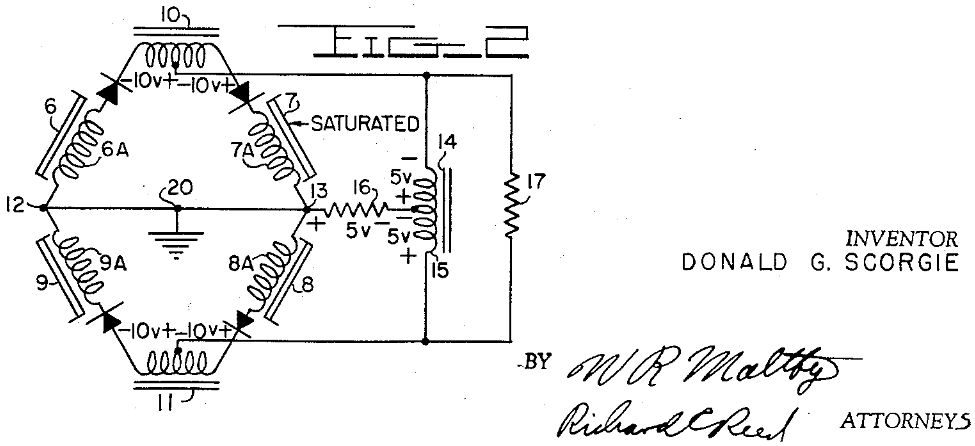
Fig. 2 is a schematic diagram of a portion of Fig. 1 illustrating voltage distribution under specific conditions.

To better understand the operation of resistor 16, reference is now made to Fig. 2 which shows the load circuits of Fig. 1 with exemplary voltages indicated thereon. In Fig. 2 common terminals 12 and 13 are shown connected to ground as at 20. It is assumed that the supply voltage and the windings 10 and 11 are such that 20 volts appears across each of windings 10 and 11 thus establishing 10 volts between the center tap and either extremity of windings 10 and 11. Assuming the situation where core 7 is saturated, current is flowing to the load from the 10 volts across the right hand side of transformer 10 through rectifier $7_R$, load winding $7_A$, resistor 16, and the upper half of winding 15 back to the center tap of winding 10. To simplify the explanation it will be presumed that there is no voltage drop across rectifier $7_R$ or coil $7_A$ and that the 10 volts across half of winding 10 is developed across resistor 16 and the upper half of winding 15. Then by selecting resistor 16 of appropriate value such that half of the 10 volts will develop across this resistor as indicated in Fig. 2, it will be seen that the center tap of transformer winding 15 will be sent 5 volts below ground since terminal 13 is at ground potential. By autotransformer action, the 5 volts developed across the upper half of transformer winding 15 will induce a corresponding 5 volts across the lower half of winding 15 with the lower terminal positive. Since the center tap of winding 15 is 5 volts below ground potential, raising the lower terminal 5 volts from the center terminal will elevate it exactly to ground potential. The lower terminal of winding 15 is connected directly to the center terminal of supply winding 11 thus establishing it also at ground potential. Thus the effect of the output load current in load winding $7_A$ produces only equal potential across the load windings $8_A$ and $9_A$ of the resetting cores and will produce no distortion in the next half cycle of the output voltage. In order that either half of winding 15 of transformer 14 will present the proper impedance to divide half the output voltage with resistor 16, output resistor 17 must be given the proper value with respect to that of resistor 16. It will be readily appreciated from standard transformer impedance theory that when output resistor 17 equals 4 times load resistor 16, transformer winding 15 will reflect the desired impedance.

Referring again to Fig. 1, each leg of the ring circuit includes a series resistor designated 22, 23, 24 and 25. These resistors were not previously discussed since they are not required unless both gating cores should reach saturation during the gating half cycle. If such should occur the A.C. supply winding would be short circuited through the rectifiers and load windings and damaging high current would flow, hence as a safeguard resistors 22 through 25 have been inserted for current limiting purposes.

Figure 3:
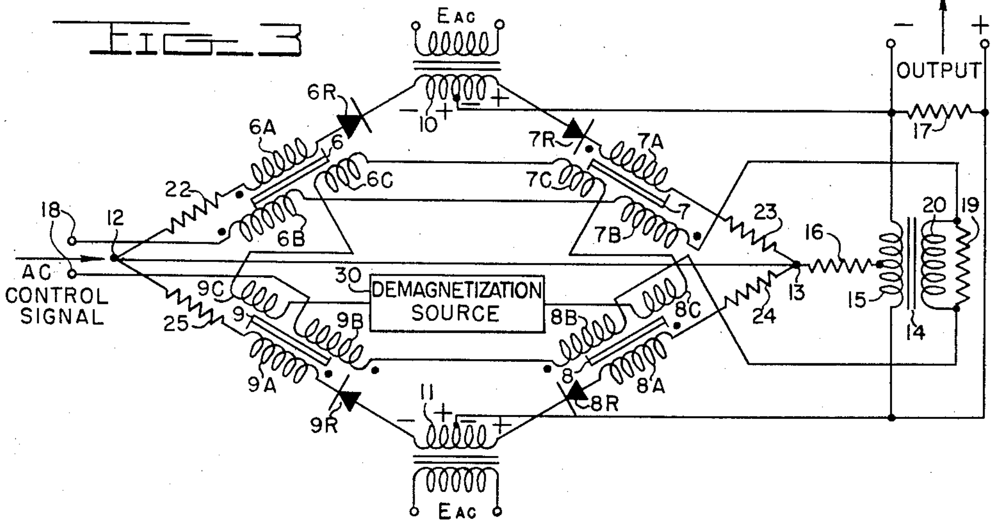
Fig. 3 is a schematic diagram of a variant embodiment of this invention.

Saturation of both cores on the gating cycle could readily occur in the absence of a control signal to differentially reset the cores. This is particularly true since for linear response it is desirable that equal reset be provided for the resetting cores in the absence of a control signal. This may be done by making the cores 6 through 9 of low remanence or introducing air gaps in the cores to permit them to drop to zero saturation in the absence of a reset signal. Alternatively it may be done by providing auxiliary windings on the cores as shown in Fig. 3, to which reference is now made. The circuit of Fig.

3 is identical with that of Fig. 1 but with the addition of auxiliary windings $6_C$, $7_C$, $8_C$ and $9_C$ to each of cores 6, 7, 8 and 9, respectively. The four auxiliary windings are connected in a third ring circuit and supplied power from demagnetization source 30. The third ring circuit containing the auxiliary windings is supplied with a reset signal from reset signal source 30. For example, source 30 may be a constant current source selected to establish a predetermined saturation level in each of cores 6 through 9. Alternatively, it could be a high voltage, high impedance alternating current source to provide demagnetization of the cores in the absence of their reset signal. While the core of transformer 14 is indicated to be the ordinary type in each of the figures, some advantage can be obtained by substituting a high remanence material to preclude its reacting upon the saturable cores because of the stored energy feedback.

While only limited and specific embodiments of this invention have been herein disclosed and described, it will be understood that modifications may be made without departing from the spirit and scope of this invention as defined in the appended claims.

What is claimed is:

1. A magnetic amplifier comprising two pairs of saturable cores having load and control windings, separate rectifier means and separate center tapped alternating current sources serially connected with each pair of said load windings, a common terminal connected to the series connections of each pair of load windings, a center tapped load impedance connected across said source center taps, means connecting the load impedance center tap to the common terminal, said rectifier means being poled to permit conduction through each pair of load windings on alternate half cycles of the source frequency, control signal input terminals connected to said pairs of control windings so as to differentially reset the cores of each pair.

2. A magnetic amplifier comprising two pairs of saturable cores having load and control windings, separate rectifier means and separate center tapped alternating current sources serially connected with each pair of said load windings, a common terminal connected to the series connections of each pair of load windings, a load impedance connected across the center taps of said sources, said rectifier means being poled to permit conduction through each pair of said load windings on alternate half cycles of the source frequency, control signal input terminals connected to said control windings so as to differentially reset the cores of each pair, and copensating means for holding the center tap of the source not delivering power to the load at the same potential as the common terminal.

3. A magnetic amplifier comprising two pairs of saturable cores having load and control windings, separate rectifier means and separate center tapped alternating current sources serially connected with each pair of said load windings, a common terminal connected to the series connections of each pair of load windings, a load impedance connected across the center taps of said sources, said rectifier means being poled to permit conduction through each pair of said load windings on alternate half cycles of the source frequency, control signal input terminals connected to said control windings so as to differentially reset the cores of each pair, compensating means for holding the center tap of the source not delivering power to the load at the same potential as the common terminal, and feedback means connected between the load impedance and the control circuit to oppose voltage induced into the control circuit through the gating cores.

4. A magnetic amplifier comprising two pairs of saturable cores having load and control windings, separate rectifier means and separate center-tapped alternating current sources serially connected with each pair of said load windings, a common terminal connected to the series connections of each pair of load windings, a center tapped load impedance connected across said source center taps, a compensating load impedance connected between said load impedance center tap and said common terminal, said rectifier means being poled to permit conduction through each pair of load windings on alternate half cycles of the source frequency, and control signal input terminals connected to said control windings to differentially reset the cores of each pair.

5. A magnetic amplifier comprising two pairs of saturable cores having load and control windings, separate rectifier means and separate center-tapped alternating current sources serially connected with each pair of said load windings, a common terminal connected to the series connections of each pair of load windings, a center-tapped output transformer connected across said source center taps, a compensating load impedance connected between said output transformer center tap and said common terminal and proportioned to develop substantially half the output voltage thereacross, said rectifier means being poled to permit conduction through each pair of load windings on alternate half cycles of the source frequency, and control signal input terminals connected to said control windings to differentially reset the cores of each pair.

6. A magnetic amplifier comprising two pairs of saturable cores having load and control windings, separate rectifier means and separate center-tapped alternating current sources serially connected with each pair of said load windings, a common terminal connected to the series connections of each pair of load windings, a center-tapped output transformer and load resistor connected in parallel across said source center taps, a compensating load resistor connected between said output transformer center tap and the common terminal and having a value substantially ¼ the output load resistor, said rectifier means being poled to permit conduction through each pair of load windings on alternate half cycles of the source frequency, and control signal input terminals connected to said control windings to differentially reset the cores of each pair.

7. A magnetic amplifier comprising two pairs of saturable cores having load and control windings, separate rectifier means and separate center-tapped alternating current sources serially connected with each pair of said load windings, a common terminal connected to the series connections of each pair of load windings, a center-tapped load impedance connected across said source center taps, a compensating load impedance connected between said load impedance center tap and said common terminal, said rectifier means being poled to permit conduction through each pair of load windings on alternate half cycles of the source frequency, control signal input terminals connected to said control windings to differentially reset the cores of each pair, and feedback means connected between the output circuit and the control circuit to oppose voltage induced into the control circuit through the gating cores.

8. A magnetic amplifier comprising two pairs of saturable cores having load and control windings, separate rectifier means and separate center-tapped alternating current sources serially connected with each pair of said load windings, a common terminal connected to the series connections of each pair of load windings, a center-tapped output transformer connected across said source center taps, a compensating load impedance connected between said output transformer center tap and said common terminal and proportioned to develop substantially half the output voltage thereacross, said rectifier means being poled to permit conduction through each pair of load windings on alternate half cycles of the source frequency, control signal input terminals connected to said control windings to differentially reset the cores of each pair, all of said control windings being connected in series to said control signal input terminals, and a secondary winding on said output transformer connected into the series circuit of said control windings to induce feedback thereto.

9. A magnetic amplifier comprising two pairs of saturable cores having load and control windings, separate rectifier means and separate center-tapped alternating current sources serially connected with each pair of said load windings, a common terminal connected to the series connections of each pair of load windings, a center-tapped load impedance connected across said source center taps, a compensating load impedance connected between said load impedance center tap and said common terminal, said rectifier means being poled to permit conduction through each pair of load windings on alternate half cycles of the source frequency, control signal input terminals connected to said control windings to differentially reset the cores of each pair, and means for resetting the resetting pair of cores to zero in the absence of a control signal.

10. A magnetic amplifier comprising two pairs of saturable cores having load and control windings, separate rectifier means and separate center-tapped alternating current sources serially connected with each pair of said load windings, a common terminal connected to the series connections of each pair of load windings, a center-tapped load impedance connected across said source center taps, a compensating load impedance connected between said load impedance center tap and said common terminal, said rectifier means being poled to permit conduction through each pair of load windings on alternate half cycles of the source frequency, control signal input terminals connected to said control windings to differentially reset the cores of each pair, a third winding on each of said saturable cores, and a demagnetizing energy source connected to all of said third windings.

References Cited in the file of this patent

UNITED STATES PATENTS

| | | |
|---|---|---|
| 2,704,823 | Storm | Mar. 22, 1955 |
| 2,768,345 | Ogle et al. | Oct. 23, 1956 |

FOREIGN PATENTS

| | | |
|---|---|---|
| 598,285 | Great Britain | Feb. 13, 1948 |